3,458,775
SOLID ELECTROLYTIC CAPACITOR HAVING
MIXED DIOXIDE SEMICONDUCTOR LAYER
Simon Flaks and Roger Depoutot, Paris, France, assignors to Société Lignes Telegraphiques et Telephoniques, Paris, France, a joint-stock company of France France, a joint-stock company of France
Filed Feb. 8, 1967, Ser. No. 614,539
Claims priority, application France, Apr. 20, 1966, 58,521
Int. Cl. H01g 9/02, 9/04
U.S. Cl. 317—230                              3 Claims

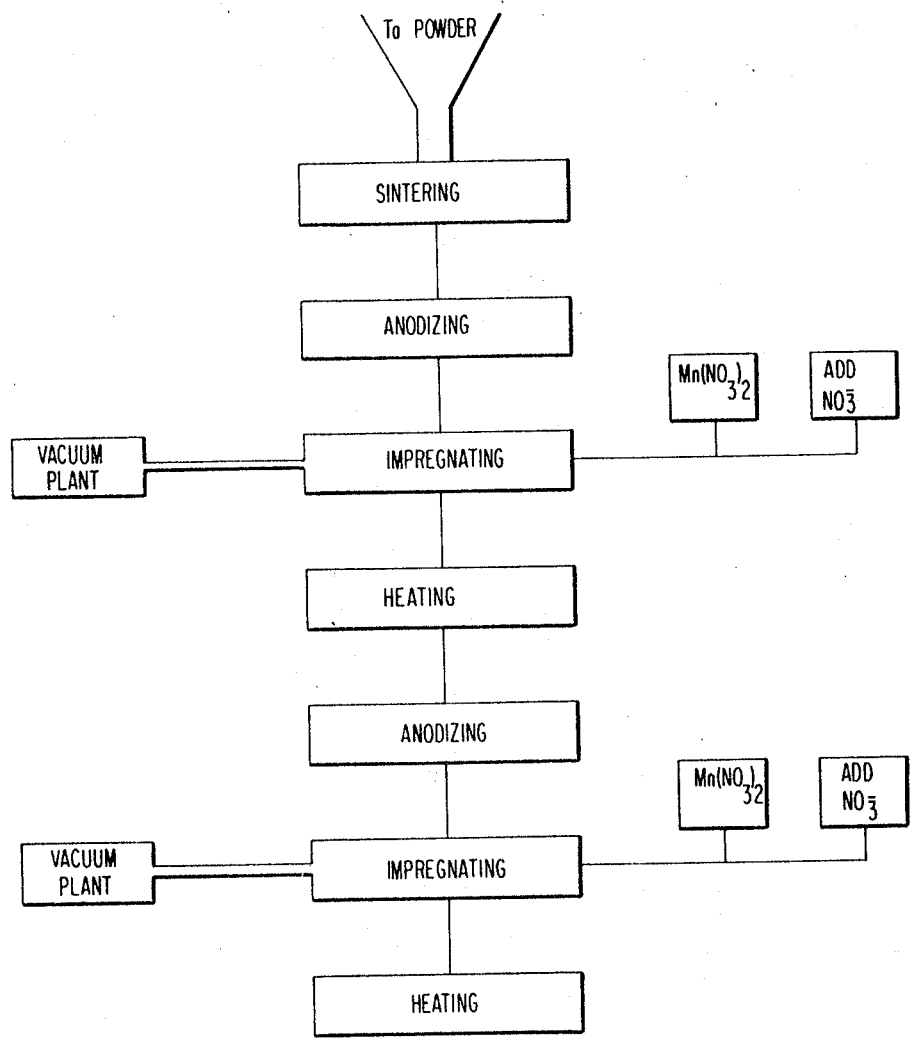

ABSTRACT OF THE DISCLOSURE

In a solid electrolytic capacitor, the semiconductor layer is processed from an anodized anode impregnated with a manganese nitrate solution containing a nitrate of a metal of the first group of the Mendeleev classification.

---

The invention is concerned with improvements to the solid electrolytic capacitors manufacture. Solid electrolytic capacitors are well known in the art. Roughly they consist of a sintered film forming metal anode which has been anodized in order that the oxide coating acts as the capacitor dielectric. A semiconductor layer, usually manganese dioxide, is coated over the spongy anode and a graphite external layer constitutes the cathode. The capacitor is then encapsulated or packaged. The anode lead is a wire, usually Ta, embedded in the spongy anode during sintering operation, the second lead is electrically connected to the cathode. Due to their numerous advantages over prior art electrolytic capacitors, the solid type capacitors have been widely used. The users' requirements also have become evermore stringent. Such technical characteristic improvements as high temperature operation, increase in operating voltage and lower dissipation factor require new designs and new developments.

It is an object of the present invention to provide means for reducing the dissipation factor of solid electrolytic capacitor. It is another object of the invention to provide means for reducing capacitance derating with respect to temperature. It is an object of the invention to provide means for increasing the operating temperature of solid electrolytic capacitors.

According to the present invention, in a solid electrolytic capacitor, the semiconductor layer is obtained through impregnation of the spongy previously anodized anode with a liquid mixture of nitrates comprising manganese nitrate and a nitrate of metal of the first group of Mendeleev's classification. According to a preferred mebodiment of the invention, the ratio of the two nitrates is chosen such that the weight ratio of the first group metal to the manganese weight is comprised between 1 and 2%. According to a first embodiment of the invention, the first group metal is cesium. According to another embodiment of the invention, the first group metal is thorium.

The invention will be fully understood by reference to the following description which is given by way of illustration. The invention will be applied to a tantalum solid electrolytic capacitor. It should be understood that any other film forming metal such as niobium can be used for the anode.

The single figure of the drawing shows in flow sheet form the steps of manufacture of an anode in accordance with the present invention. As is well known in the prior art relating to the manufacture of solid electrolytic capacitors, the tantalum powder is first sintered in a mole of appropriate shape. The resulting metal sponge is then covered with an oxide layer by an anodizing process and it is this oxide layer which acts as the capacitor dielectric. The filmed sponge is then impregnated with manganese nitrate which is decomposed into manganese dioxide through a heating step which effects pyrolytic decomposition of the nitrate. As is also well known, the heating step may partly destroy the oxide coating and if so, it is necessary to reform it through a further anodyzing step. In order to obtain the required quantity of manganese dioxide, it may also be necessary to repeat the impregnation step and the heating step.

According to the present invention, the impregnating solution consists of a mixture of manganese nitrate and a first group metal nitrate. The quantities of the two nitrates are selected so that the ratio of the weight of the first group metal to the weight of the manganese is comprised between 1 and 2%. The manufacturing steps are identical with current practice steps. In a first example the impregnating solution, called solution A, is a mixture of manganese nitrate at 2 moles per liter and cesium nitrate at .16 mole per liter.

In a second example, the impregnating solution, called solution B, is a manganese nitrate solution at 2 moles per liter containing thorium nitrate at .05 mole per liter.

The table below gives some of the technical characteristics of anodes of the same type impregnated respectively with pure manganese nitrate at 2 moles per liter, solution A and solution B. As mentioned all the manufacturing steps remain identical. It can be appreciated that a substantial reduction in the dissipation factor is obtained, amounting to about 30% in the case of solution B. Capacitance derating with respect to temperature is also lowered by about 25%. The below figures are given for the same anode structure.

TABLE

| | Dissipation factor | Percent capacitance derating between 21° and 85° |
|---|---|---|
| Pure manganese nitrate solution | 3.45 | 12.93 |
| Solution (A) | 2.9 | 11.33 |
| Solution (B) | 2.6 | 10.3 |

From the theoretical point of view, it is difficult to explain the influence of metallic additions to the manganese dioxide as far as its semiconducting properties are concerned. It has been established that pyrolytic decomposition of the manganese nitrate gives the alpha type dioxide which is crystalline and stoichiometric. An inclusion of foreign atoms seems to lead to the formation of gamma type manganese dioxide which is non-stoichiometric and has a much more active catalytic power. (Refer to Compte Rendu Acad. Sciences, Paris, Feb. 9, 1959, page 776, communication from MM. Chevillot, Brenet and Schweizer.) Measurements carried on by the above research workers show that the gamma type manganese dioxide has a much higher resistivity than the alpha type. This could explain the improvement relating to the dissipation factor.

It is more doubtful to find here the explanation for the decrease of the temperature derating. Owing to the difficulty of identification of the type of manganese dioxide which is actually formed in the anode structure, the above explanation should be considered as a working hypothesis only.

We claim:
1. In the method for making a solid electrolytic capacitor including the steps of sintering particles of a film-forming metal into a spongy self-supporting anode, anodizing said anode for forming a dioxide film on the surface of said particles throughout the anode, impregnating said anode with a solution of manganese nitrate to form a coating over the dielectric film, pyrolytically converting the manganese nitrate to a manganous dioxide layer overlying said film and applying a conductive cathode layer on the manganous dioxide layer, the improvement comprising impregnating the spongy anode with a solution of a mixture composed of manganese nitrate and one of the group consisting of cesium nitrate and thorium nitrate.

2. A method as defined by claim 1 in which the ratio of the weight of the cesium or thorium nitrate to the manganese nitrate is between one and two percent.

3. A dry electrolytic capacitor comprising an anode of sintered film-forming metal having an oxide coating thereon and a manganous dioxide layer containing a dioxide selected from the group consisting of cesium dioxide and thorium dioxide, said layer being the converted product of a solution which is a mixture of manganese nitrate and one of the group consisting of cesium nitrate and thorium nitrate impregnated in said anode and converted in situ.

References Cited

UNITED STATES PATENTS

| | | | |
|---|---|---|---|
| 3,029,370 | 4/1962 | Hill | 317—230 |
| 3,054,029 | 9/1962 | Wagner et al. | 317—230 |
| 3,166,693 | 1/1965 | Haring et al. | 317—230 |
| 3,241,008 | 3/1966 | Komisarek | 317—230 |
| 3,397,446 | 8/1968 | Sharp | 317—230 |

JAMES D. KALLAN, Primary Examiner

U.S. Cl. X.R.

29—570